United States Patent
Lo et al.

(10) Patent No.: US 9,785,206 B2
(45) Date of Patent: Oct. 10, 2017

(54) METHOD AND APPARATUS FOR HOUSING A HARD-DISK DRIVE USING A TRAY WITH ANCHORING STRIPS

(71) Applicants: Jimmy Lo, Los Altos Hills, CA (US); Zhiqiang Zeng, Fremont, CA (US)

(72) Inventors: Jimmy Lo, Los Altos Hills, CA (US); Zhiqiang Zeng, Fremont, CA (US)

(73) Assignee: Netgear, Inc., Carlsbad, CA (US)

( * ) Notice: Subject to any disclaimer, the term of this patent is extended or adjusted under 35 U.S.C. 154(b) by 0 days.

(21) Appl. No.: 15/160,778

(22) Filed: May 20, 2016

(65) Prior Publication Data

US 2016/0291648 A1 Oct. 6, 2016

Related U.S. Application Data

(62) Division of application No. 13/753,471, filed on Jan. 29, 2013, now Pat. No. 9,383,784.

(51) Int. Cl.
*G06F 1/18* (2006.01)

(52) U.S. Cl.
CPC ......... *G06F 1/187* (2013.01); *Y10T 29/49021* (2015.01)

(58) Field of Classification Search
CPC .................. G06F 1/187; Y10T 29/49021
USPC ............... 211/26, 26.2; 361/679.33, 679.37, 361/679.38, 679.39
See application file for complete search history.

(56) References Cited

U.S. PATENT DOCUMENTS

| | | | | |
|---|---|---|---|---|
| 6,084,768 A * | 7/2000 | Bologna | ................ | G06F 1/184 248/636 |
| 6,088,221 A * | 7/2000 | Bologna | ................ | G06F 1/184 312/223.2 |
| 6,094,342 A * | 7/2000 | Dague | .................... | G06F 1/184 312/333 |
| 6,373,696 B1 * | 4/2002 | Bologna | ................ | G06F 1/184 361/679.33 |
| 6,798,651 B2 * | 9/2004 | Syring | ................. | G11B 33/124 248/623 |
| 6,819,555 B2 * | 11/2004 | Bologna | ............... | G11B 33/08 361/679.33 |
| 7,457,110 B2 * | 11/2008 | Lo | ........................... | G06F 1/184 361/679.33 |
| 7,483,268 B1 * | 1/2009 | King, Jr. | ................. | G06F 1/187 248/682 |
| 7,684,181 B2 * | 3/2010 | Peng | .................... | G11B 33/123 312/333 |

(Continued)

*Primary Examiner* — Stanton L Krycinski
(74) *Attorney, Agent, or Firm* — James M. Wu; JW Law Group

(57) ABSTRACT

A method and apparatus discloses a tray configured to house a hard-disk drive ("HDD") using at least one semi-flexible anchoring strip. An HDD assembly device, in one aspect, includes a tray, a U-shaped semi-flexible anchoring frame, and an HDD. The tray has a base, a front panel, a first side panel, and a second side panel, wherein the first side panel and the second side panel includes tracks along longitudinal edges of the first and the second side panels. The U-shaped semi-flexible anchoring frame includes a front piece, a first strip, and a second strip, wherein the first strip is configured to fit in the track of the first side panel allowing the first strip to slide along the track of the first side panel. The HDD has at least two mounting holes on each side and able to seat in the U-shaped semi-flexible anchoring frame.

10 Claims, 8 Drawing Sheets

(56) References Cited

U.S. PATENT DOCUMENTS

| | | | | |
|---|---|---|---|---|
| 7,697,276 B2* | 4/2010 | Peng | G11B 33/12 | 248/694 |
| 7,697,278 B2* | 4/2010 | Peng | G06F 1/187 | 248/633 |
| 7,701,706 B2* | 4/2010 | Peng | G11B 33/124 | 248/633 |
| 7,755,887 B2* | 7/2010 | Chen | G06F 1/187 | 312/223.2 |
| 7,778,017 B2* | 8/2010 | Huang | G06F 1/187 | 248/318 |
| 7,881,052 B2* | 2/2011 | Crippen | G11B 33/122 | 312/223.1 |
| 7,903,401 B2* | 3/2011 | Lee | G06F 1/187 | 361/679.33 |
| 8,064,195 B2* | 11/2011 | Zhang | G06F 1/187 | 211/26 |
| 8,077,468 B2* | 12/2011 | Fujikawa | G06F 1/187 | 361/679.36 |
| 8,089,752 B2* | 1/2012 | Xu | G06F 1/187 | 361/679.33 |
| 8,111,509 B2* | 2/2012 | Lee | G06F 1/181 | 211/26 |
| 8,159,817 B2* | 4/2012 | Lin | F16C 29/02 | 312/223.1 |
| 8,246,000 B2* | 8/2012 | Peng | G11B 33/124 | 248/682 |
| 8,251,339 B2* | 8/2012 | Peng | G06F 1/187 | 248/682 |
| 8,432,681 B2* | 4/2013 | Tung-Ke | G11B 33/08 | 361/679.33 |
| 8,480,039 B2* | 7/2013 | Chang | G11B 33/124 | 248/27.1 |
| 8,755,178 B2* | 6/2014 | Zheng | G11B 33/124 | 292/80 |
| 8,873,232 B2* | 10/2014 | Tsai | G06F 1/187 | 312/223.2 |
| 2006/0023413 A1* | 2/2006 | Lo | G06F 1/184 | 361/679.02 |
| 2007/0035920 A1* | 2/2007 | Peng | G11B 33/124 | 361/679.31 |
| 2009/0097196 A1* | 4/2009 | Peng | G06F 1/187 | 361/679.34 |
| 2009/0161308 A1* | 6/2009 | Chen | G11B 33/128 | 361/679.33 |
| 2009/0161309 A1* | 6/2009 | Yang | G11B 17/0407 | 361/679.39 |
| 2009/0167124 A1* | 7/2009 | Lee | G06F 1/187 | 312/223.2 |
| 2010/0172086 A1* | 7/2010 | Chen | G11B 33/128 | 361/679.33 |
| 2011/0019357 A1* | 1/2011 | Lin | F16C 29/02 | 361/679.39 |
| 2011/0051350 A1* | 3/2011 | Zhang | G06F 1/187 | 361/679.31 |
| 2011/0075347 A1* | 3/2011 | Liu | G06F 1/187 | 361/679.33 |
| 2011/0132851 A1* | 6/2011 | Christie, Jr. | G11B 17/041 | 211/26 |
| 2011/0182023 A1* | 7/2011 | Xu | G06F 1/187 | 361/679.33 |
| 2012/0152867 A1* | 6/2012 | Ye | G11B 33/128 | 211/26 |
| 2013/0083462 A1* | 4/2013 | Zheng | G11B 33/124 | 361/679.01 |
| 2013/0112844 A1* | 5/2013 | Wang | G06F 1/187 | 248/636 |
| 2013/0314868 A1* | 11/2013 | Tsai | G06F 1/187 | 361/679.33 |

* cited by examiner

METHOD AND APPARATUS FOR HOUSING A HARD-DISK DRIVE USING A TRAY WITH ANCHORING STRIPS

PRIORITY

This application is a divisional application of U.S. patent application Ser. No. 13/753,471, filed on Jan. 29, 2013 in the name of the same inventor and entitled "Method and Apparatus for Housing a Hard-Disk Drive Using a Tray with Anchoring Strips," the disclosure of which is hereby incorporated into the present application by reference.

FIELD

The present invention relates to computer storage system. More specifically, the present invention relates to hard-disk drive for memory storage.

BACKGROUND

Data storage is essential to digital processing systems including computers, smart phones, and/or network devices. With increasing demand of instant information over wired or wireless communication network, large capacity storage devices capable of storing voluminous files and applications are in demand. One type of storage device such as hard-disk drive ("HDD") are conventionally employed to store digital information such as data, video, audio, and/or control information for computing devices. For example, a digital processing system such as a computer may house an HDD for storage. Also, conventional network attached storage ("NAS") system, which is another type of network storage device, may use one or more HDDs for data storage.

An HDD, also known as hard file and/or disk drive, contains one or more rotating discs coated with magnetic medium capable of storing digital information. A typical HDD can store relatively large amount of data. To increase storage capacity, a conventional approach is to employ multiple HDDs wherein each HDD is engaged and enclosed in an HDD tray. Multiple HDD trays can be installed in a storage bay, tower, or unit.

A problem associated with a typical HDD or HDDs in a data storage system is that it is cumbersome to maintain, access, transport, and/or replace one or more HDDs partially due to the tools and/or special equipments required. For example, to access or reach a HDD(s), a set of tools is typically required to remove and/or install HDD(s) in a network storage system. Replacement or addition of HDD often involves a laborious installation procedure including opening system's physical enclosure to reach or access the HDD(s).

SUMMARY

Embodiments of the present invention disclose an HDD assembly or device able to secure an HDD to an HDD tray using semi-flexible strips without using special tools. The HDD device, subsequently, is attached or plugged into a computing system, router, network device, and/or a storage bay. The HDD assembly or device, in one aspect, includes a tray, a U-shaped semi-flexible anchoring ("USA") frame, and an HDD. The tray has a base, a front panel, a right side panel, and a left side panel. The right side panel and the left side panel include tracks along longitudinal edges of the right and left side panels. The USA frame includes a front piece, a right strip, and a left strip, wherein the right strip is configured to be fitted in the track of right side panel. The left strip is also configured to be fitted inside the track of left side panel. The tracks allow or facilitate the right and left strips to slide along the tracks. Each side of HDD has at least two mounting holes which are configured to receive engaging pins from the USA frame.

Additional features and benefits of the exemplary embodiment(s) of the present invention will become apparent from the detailed description, figures and claims set forth below.

BRIEF DESCRIPTION OF THE DRAWINGS

Exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
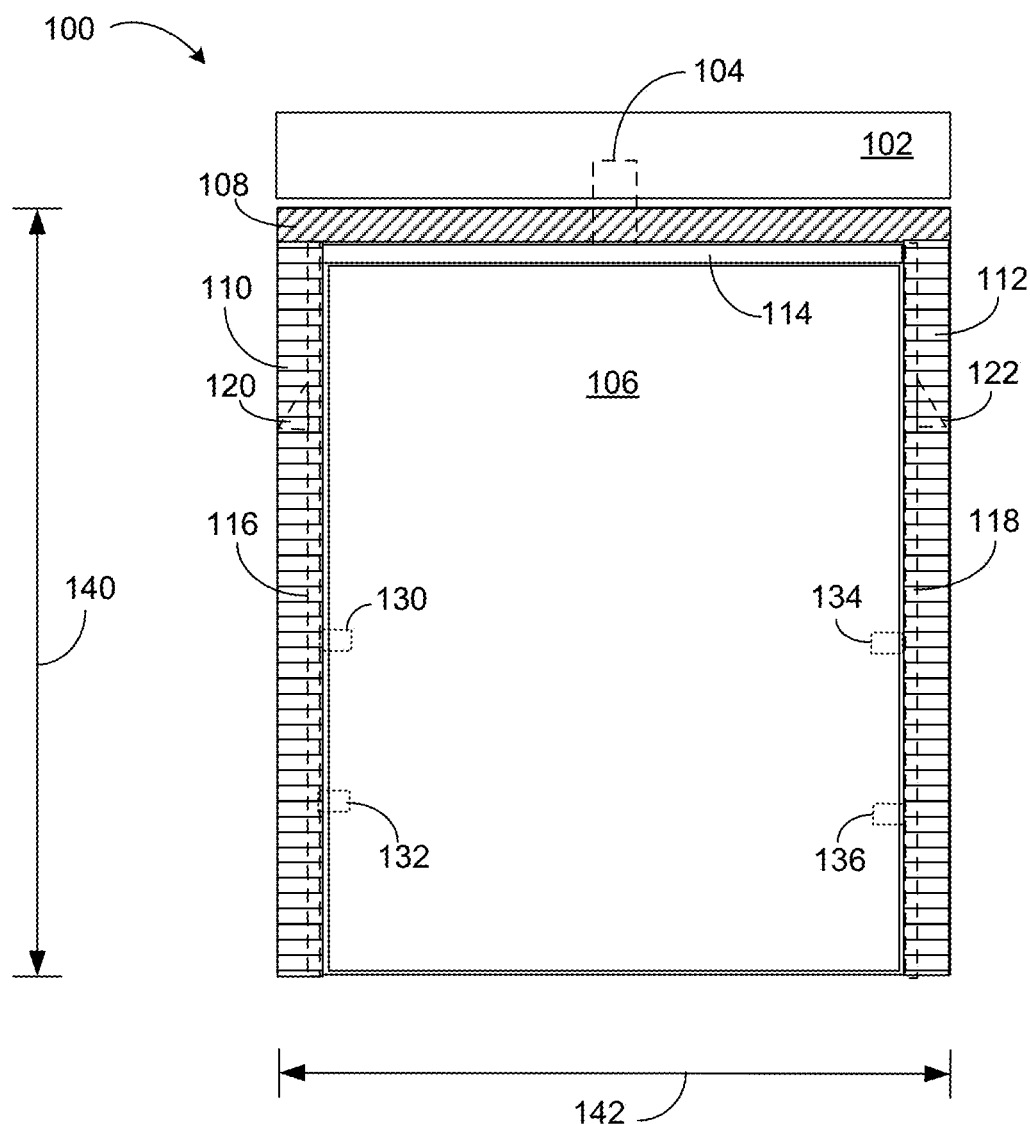
FIG. 1 is a diagram illustrating a top view of an HDD device or carry using anchoring strips in accordance with one embodiment of the invention.

Exemplary embodiment(s) of the present invention is described herein in the context of a method, system and apparatus of a hard-disk drive ("HDD") assembly or carrier using semi-flexible anchoring strips to fasten an HDD to the assembly.

Those of ordinary skills in the art will realize that the following detailed description of the exemplary embodiment(s) is illustrative only and is not intended to be in any way limiting. Other embodiments will readily suggest themselves to such skilled persons having the benefit of this disclosure. Reference will now be made in detail to implementations of the exemplary embodiment(s) as illustrated in the accompanying drawings. The same reference indicators will be used throughout the drawings and the following detailed description to refer to the same or like parts.

References to "one embodiment," "an embodiment," "example embodiment," "various embodiments," "exemplary embodiment," "one aspect," "an aspect," "exemplary aspect," "various aspects," etc., indicate that the embodiment(s) of the invention so described may include a particular feature, structure, or characteristic, but not every embodiment necessarily includes the particular feature, structure, or characteristic. Further, repeated use of the phrase "in one embodiment" does not necessarily refer to the same embodiment, although it may.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application- and business-related constraints, and that these specific goals will vary from one implementation to another and from one developer to another. Moreover, it will be understood that such a development effort might be complex and time-consuming, but would nevertheless be a routine undertaking of engineering for those of ordinary skills in the art having the benefit of this disclosure.

Various embodiments of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method.

As used herein, the singular forms of article "a", "an" and "the" are intended to include the plural forms as well, unless the context clearly indicates otherwise. Also, the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

Embodiments of the present invention disclose an HDD assembly or device able to secure an HDD to an HDD tray using semi-flexible strips without using tools. The HDD device, subsequently, is attached or plugged into a computing system, router, network device, and/or a storage bay. The HDD assembly or device, in one aspect, includes a tray, a U-shaped semi-flexible anchoring ("USA") frame, and an HDD. The tray has a base, a front panel, a right side panel, and a left side panel. The right side panel and the left side panel include tracks along longitudinal edges of the right and left side panels. The USA frame includes a front piece, a right strip, and a left strip, wherein the right strip is configured to be fitted in the track of right side panel. The left strip is also configured to be fitted inside the track of left side panel. The tracks allow or facilitate the right and left strips to slide along the tracks. Each side of HDD has at least two mounting holes which are configured to receive engaging pins from the USA frame.

FIG. 1 is a diagram 100 illustrating a top view of an HDD device using anchoring strips in accordance with one embodiment of the invention. The HDD device, herein, can also be referred to as HDD assembly, HDD carrier, HDD assembly device, and the like. Diagram 100 includes a front cover 102, a tray, a U-shaped semi-flexible anchoring ("USA") frame, and an HDD 106. Front cover 102, in one example, situated in the front of HDD device is used as a user interface panel allowing a user to access the HDD device. It should be noted that the underlying concept of the exemplary embodiment(s) of the present invention would not change if one or more components (or units) were added to or removed from diagram 100.

The tray, also known as a HDD tray, is formed with a base and three sides along the edges of the base. Three sides, viewing from the front, include a front panel 108, a right panel 110, and a left panel 112 wherein one end of front panel 108 couples to right pane 110 and another end of front panel 108 couples to left panel 112. Front panel 108 coupling to front cover 102 facilitates a locking mechanism between the tray and the USA frame. In one aspect, the locking mechanism allows a user to release the USA frame from an engaged configuration to a pullout configuration via front cover 102. Front panel 108, in one example, is coupled with front cover 102 wherein cover 102 provides a function allowing a user to retrieve the HDD device from a tower or a rack, as well as allowing a user to release the USA frame from the tray.

Right panel 110, in one embodiment, is structured in a rectangular wall which has a top side, a bottom side, two ends, wherein the bottom side of right panel 110 is connected to the edge of the base. The length of right panel 110 should have similar dimension as HDD. On the top side of right panel 110, which is at the opposite side of the base, contains a track. The track, in one embodiment, allows anchoring strip(s) to conditionally slide along the right panel 110. The sliding motion, for example, can be either moving away from front cover 102 or moving toward to front cover 102.

Left panel 112, in one embodiment, is also structured in a rectangular wall having a top side, a bottom side, two ends, wherein the bottom side of left panel 112 is connected to the edge of the base. Left panel 112 is situated opposite from right panel 110 across the base and is erected from another edge of the base to form another side of the tray. The length of left panel 112 should have similar dimension as HDD. On the top side of left panel 112, which is at the opposite side of the base, contains a track. The track, in one embodiment, allows anchoring strip(s) to conditionally slide along the left panel 112. The sliding motion, for example, can be either moving away from front cover 102 or moving toward to front cover 102.

It should be noted that front panel 108, right panel 110, left panel 112, and base can be fabricated in a single tray construction. The tray, in one aspect, can be made of various materials, such as, but not limited to, metal, aluminum, alloy, plastic, polymer, ceramic, composite, and the like. The height of tray, in one example, has a range from 5 millimeter ("mm") to 20 mm. While an exemplary length of the tray 140 can have a range between 80 mm and 200 mm, the width of the tray 142 has a range from 50 mm to 100 mm. A function of the tray is to house HDD 106 wherein the tray can be further plugged into a tower or rack.

The USA frame, in one embodiment, includes a front piece 114, a right strip 116, and a left strip 118. It should be noted that strip is also known as anchoring strip, semi-flexible anchoring strip, fastener strip, and the like. Front piece 114 includes a locking mechanism 104 and is used to interface between front panel 108 and the front side of HDD 106. Locking mechanism 104 locks the USA frame to the tray and/or release the USA frame from the tray. Front piece 114, in one example, has similar dimensions as front panel 108.

Right strip 116 further includes a stopper 120 and multiple engaging pins. One end of right strip 116 is coupled to front piece 114 and it has similar dimensions as right panel 110. At least a portion of right strip 116 can be inserted inside of track of right panel 110 whereby right strip 116 can slid along right panel 110. Right strip 116 provides an interface function between the tray and HDD 106, which secures, fastens, and/or attaches HDD 106 to the tray. Right strip 116, in one aspect, is made of flexible materials, such as plastic, fibers, polymer, aluminum, alloy, metal, and the like.

Similarly, left strip 118 includes a stopper 122 and multiple engaging pins. One end of left strip 118 is coupled to front piece 114 and it has similar dimensions as left panel 112. At least a portion of left strip 118 can be inserted inside of track of right panel 112 whereby left strip 118 can slid along left panel 112. Left strip 118 provides an interface function between the tray and HDD 106, which secures, fastens, and/or attaches HDD 106 to the tray. Left strip 118, in one aspect, is made of flexible materials, such as plastic, fibers, polymer, aluminum, alloy, metal, and the like. Front piece 114, right strip 116, and left strip 118 can be fabricated together into one single structure.

HDD 106 is a hard file and/or disk drive capable of containing one or more rotating discs coated with magnetic medium. HDD 106 is able to store digital information on each disc. HDD 106, in one example, includes four or more mounting holes 130-136 configured to anchor HDD 106 to a frame using fasteners such as screws and pins. It should be noted that solid state memory cards can be used in place of HDD 106. The solid state memory cards include semiconductor memory devices, such as flash memory, Magnetoresistive random-access memory, or the like.

An advantage of using the USA frame is that allows a user to assemble and/or disassemble an HDD without using any tools, which simplifies HDD replacement or installation process. Another advantage of using the USA frame which surrounds three sides of HDD 106 is that the USA frame is able to provide shock absorption.

Figure 2:
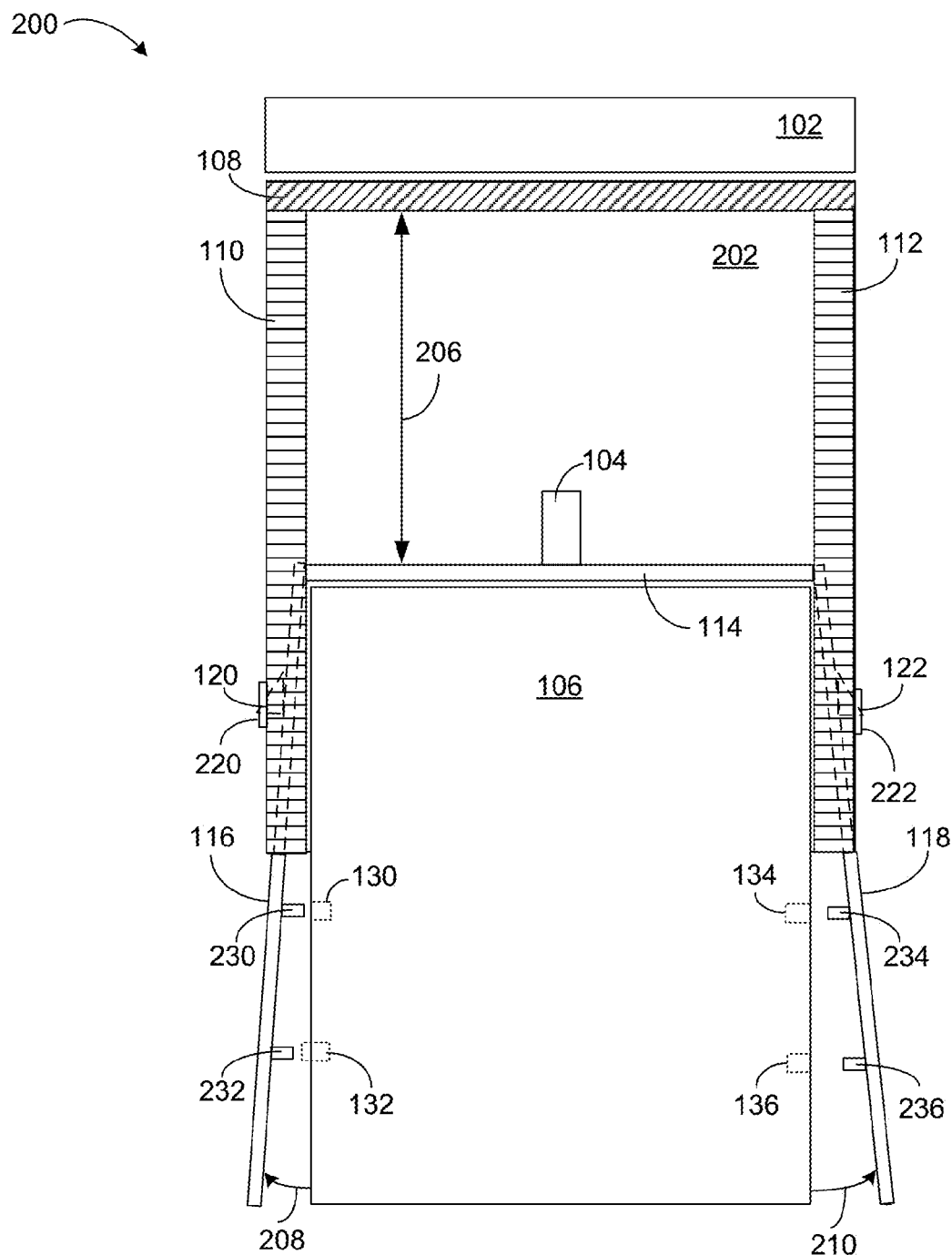
FIG. 2 is a diagram illustrating a top view of an HDD device with a portion of an HDD sliding out of a tray in accordance with one embodiment of the present invention.

FIG. 2 is a diagram 200 illustrating a top view of an HDD device with a portion of an HDD sliding out of a tray in accordance with one embodiment of the present invention. Similar to diagram 100 of FIG. 1, diagram 200, which illustrates a pullout configuration, includes a front cover 102, a tray, a USA frame, and an HDD 106. Front cover 102, in one example, situated in the front of HDD device is used as an interface panel which allows a user to access the HDD device. It should be noted that the underlying concept of the exemplary embodiment(s) of the present invention would not change if one or more components (or units) were added to or removed from diagram 200.

The tray is formed by base 202, front panel 108, right panel 110, and left panel 112. One end of front panel 108 couples to right panel 110 and another end of front panel 108 couples to left panel 112. Front panel 108, in one example, receives or couples to front cover 102 and facilitates a lock function between the tray and the USA frame. The USA frame, in one embodiment, is formed by front piece 114, right strip 116, and left strip 118. A function of front piece 114 is to disengage the USA frame from the tray using locking mechanism 104. Upon disengagement, the USA frame can slide within a predefined distance as indicated by arrow 206.

Diagram 200 illustrates an HDD device in a pullout configuration. The pullout configuration illustrates a condition in which the USA frame is pulled away from front cover 102 until stoppers 120-122 catch stop latches 220-222 on the side frames or panels of the tray. Stop latches 220-222, in one aspect, are situated in right panel 110 and left panel 112, respectively. When stopper 120-122 catch stop latches 220-222, the USA frame, in one embodiment, stops moving away from front cover 102. Depending on the applications, distance 206 can vary. An advantage of restraining the USA frame from being completely pulled out of the tray is that it prevents misplacement of the USA frame associated with the tray. In one aspect, the USA frame matches with the tray.

When the HDD device is in pullout configuration, right strip 116 and left strip 118 can be flexibly tilted away from HDD 106 as shown by arrows 208-210. As right strip 116 bends away from HDD 106 as indicated by arrow 208, engaging pins 230-232 on strip 116 are disengaged from mounting holes 130-132 on HDD 106. Similarly, when left strip 118 bends away from HDD 106 as indicated by arrow 210, engaging pins 234-236 are disengaged from mounting holes 134-136 of HDD 106. When engaging pins 230-236 disengage with mounting holes 130-136, HDD 106 can be dismounted or removed from the USA frame. It should be noted that the flexibility of the strips can vary depending on the applications.

Figure 3:
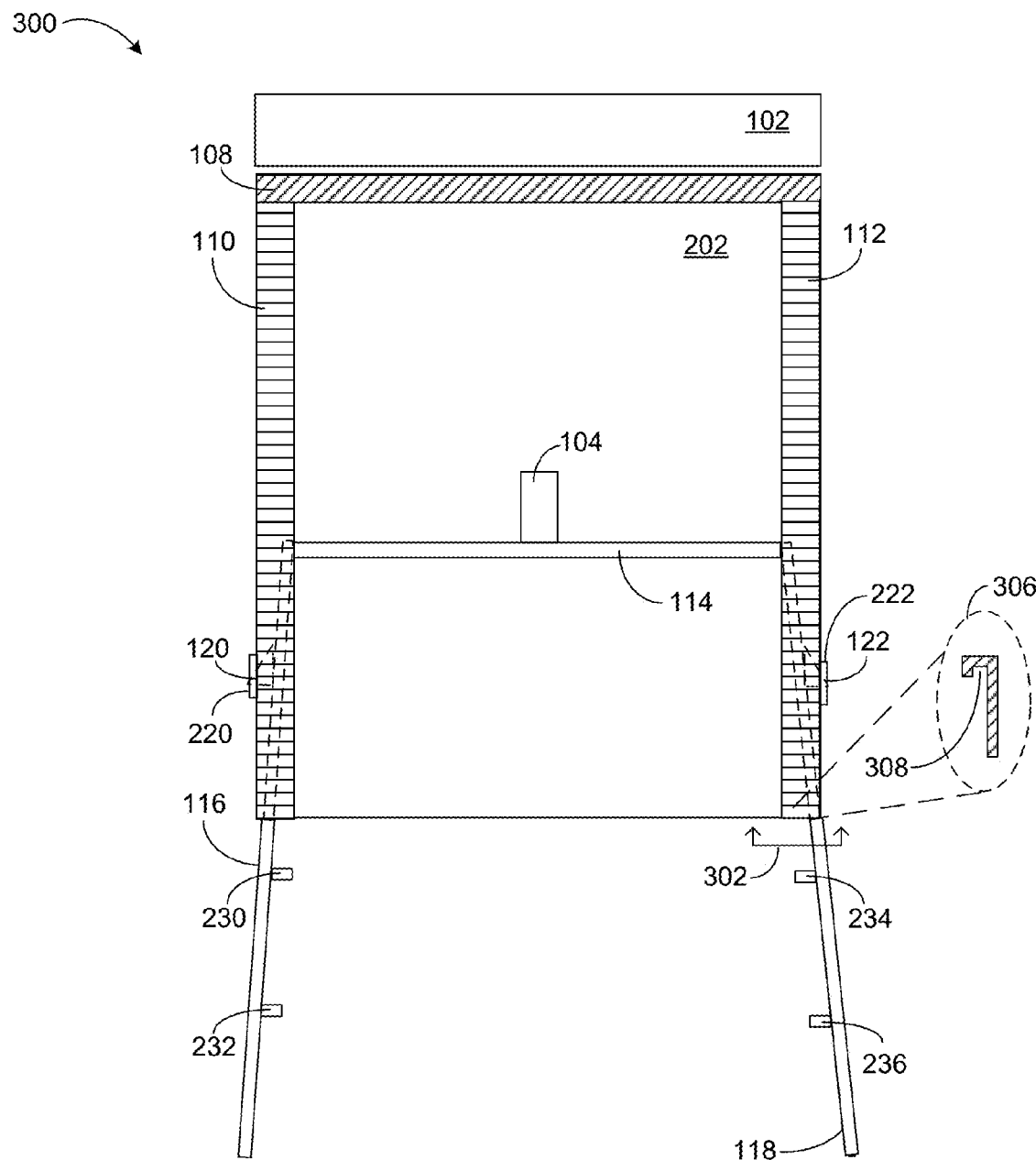
FIG. 3 is a diagram illustrating a top view of an HDD device showing an U-shaped semi-flexible anchoring frame without an HDD in accordance with one embodiment of the invention.

FIG. 3 is a diagram illustrating a top view of an HDD device or assembly showing the USA frame without an HDD in accordance with one embodiment of the invention. Similar to diagram 200 of FIG. 2, diagram 300, which illustrates a pullout configuration, includes a front cover 102, a tray, and a USA frame. While the tray is formed by base 202, front panel 108, right panel 110, and left panel 112, the USA frame, in one aspect, is formed by front piece 114, right strip 116, and left strip 118. The top portions of right panel 110 and left panel 112 include tracks for housing the flexible strips such as strip 116-118 for sliding. End view 306 of left panel 112 as indicated by arrow 302 illustrates a "7-shaped" or "hock-shaped" structure 308 which is used to facilitate movement of strips 116-118. For example, an anchoring strip such as left strip 118 can conditionally slide within the hock-shaped structure 308 while structure 308 limits how far the strip can move.

Figure 4:
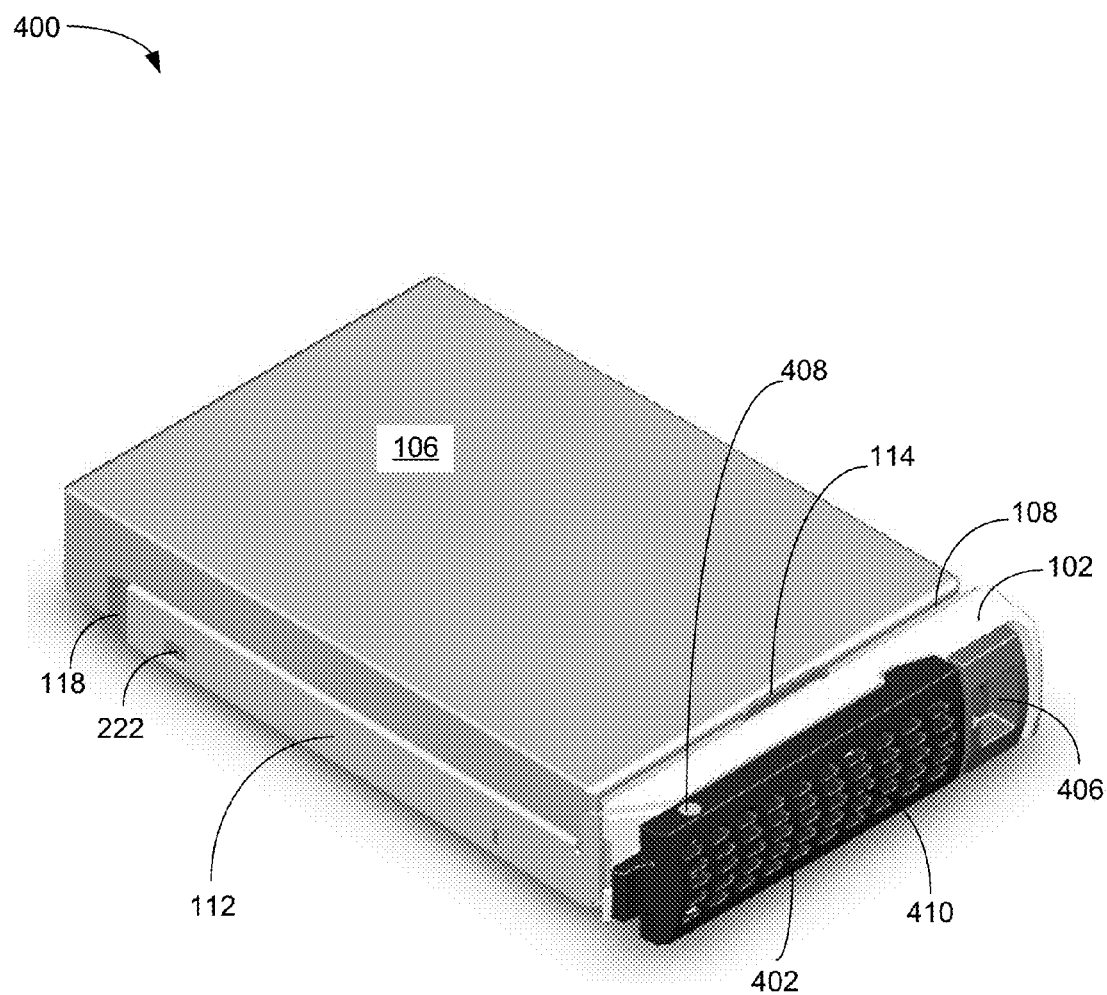
FIG. 4 is a three-dimensional ("3D") perspective diagram illustrating an HDD device or assembly in accordance with one embodiment of the present invention.

FIG. 4 is a 3D perspective diagram 400 illustrating an HDD device or assembly in accordance with one embodiment of the present invention. Similar to diagram 100 of FIG. 1, diagram 400, which illustrates an engaged configuration, includes a front cover 102, a tray, a USA frame, and an HDD 106. Front cover 102, in one example, situated in the front of HDD device is used as an interface panel to allow a user to access the HDD device. It should be noted that the underlying concept of the exemplary embodiment(s) of the present invention would not change if one or more components (or units) were added to or removed from diagram 400.

Front cover 102, in one embodiment, includes a latch 406, a door 410, grid 402, and a spring 408. While grid 402 contains heat dissipating vents for heat dissipation, spring 408 facilitates opening and closing door 410. Latch 406, in one embodiment, is used to disengage the USA frame from the tray. Latch 406 can also be used to release door 410 to an open position whereby a user can hold door 410 as a handle to pull the HDD device from a storage bay or storage rack.

Figure 5:
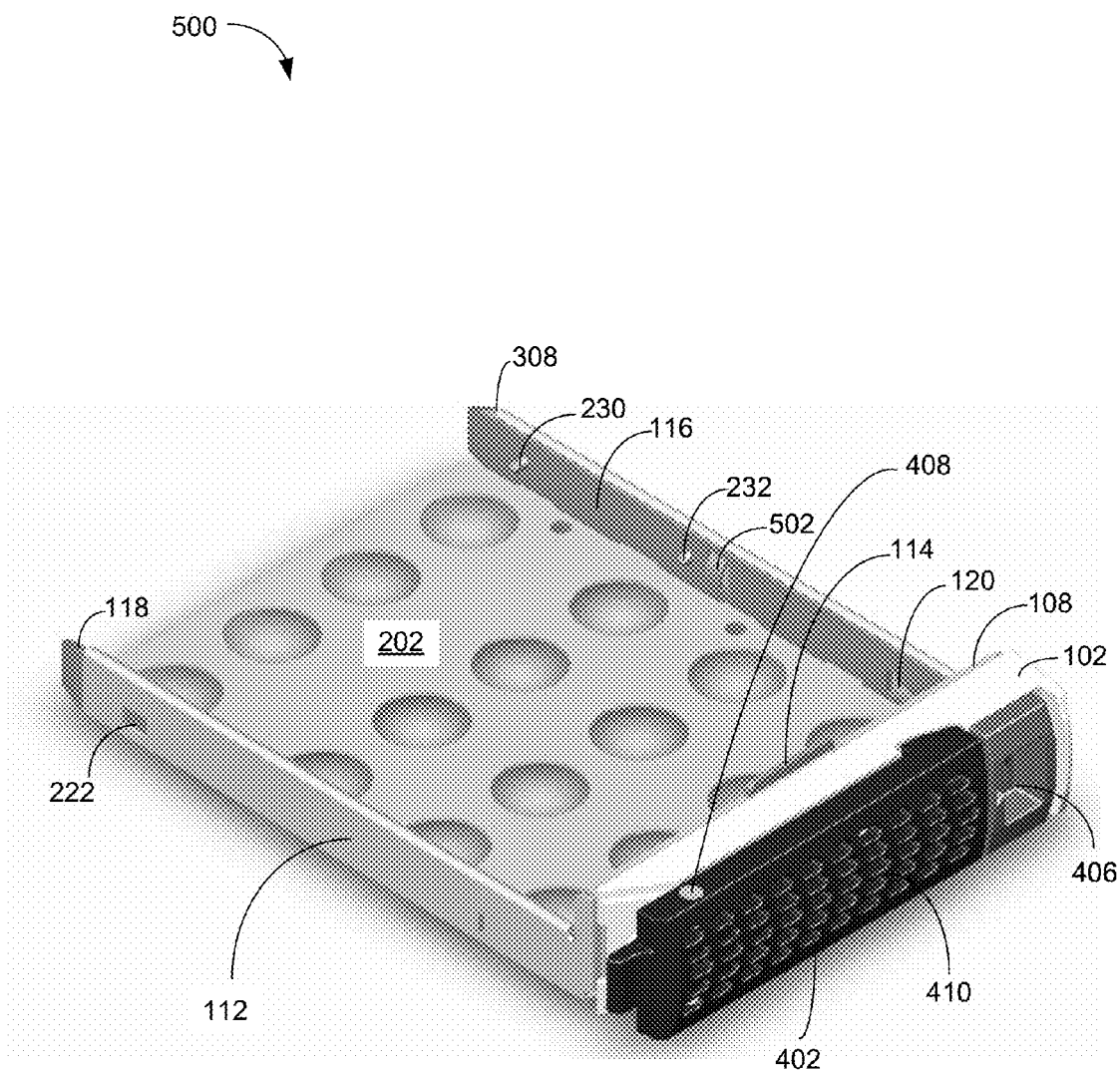
FIG. 5 is a 3D perspective diagram illustrating a tray with an U-shaped semi-flexible anchoring frame without an HDD in accordance with one embodiment of the present invention.

FIG. 5 is a 3D perspective diagram 500 illustrating a tray or HDD tray with a USA frame without an HDD in accordance with one embodiment of the present invention. Diagram 500 illustrates that the USA frame and the tray are in an engaged or locking configuration. In one aspect, right strip 116 further includes an elastic clamp 502 used to secure or hold an HDD in its predefined position with respect to the USA frame. Note that left strip 118 may also include an elastic clamp for holding or reinforcing an HDD in place.

Figure 6:
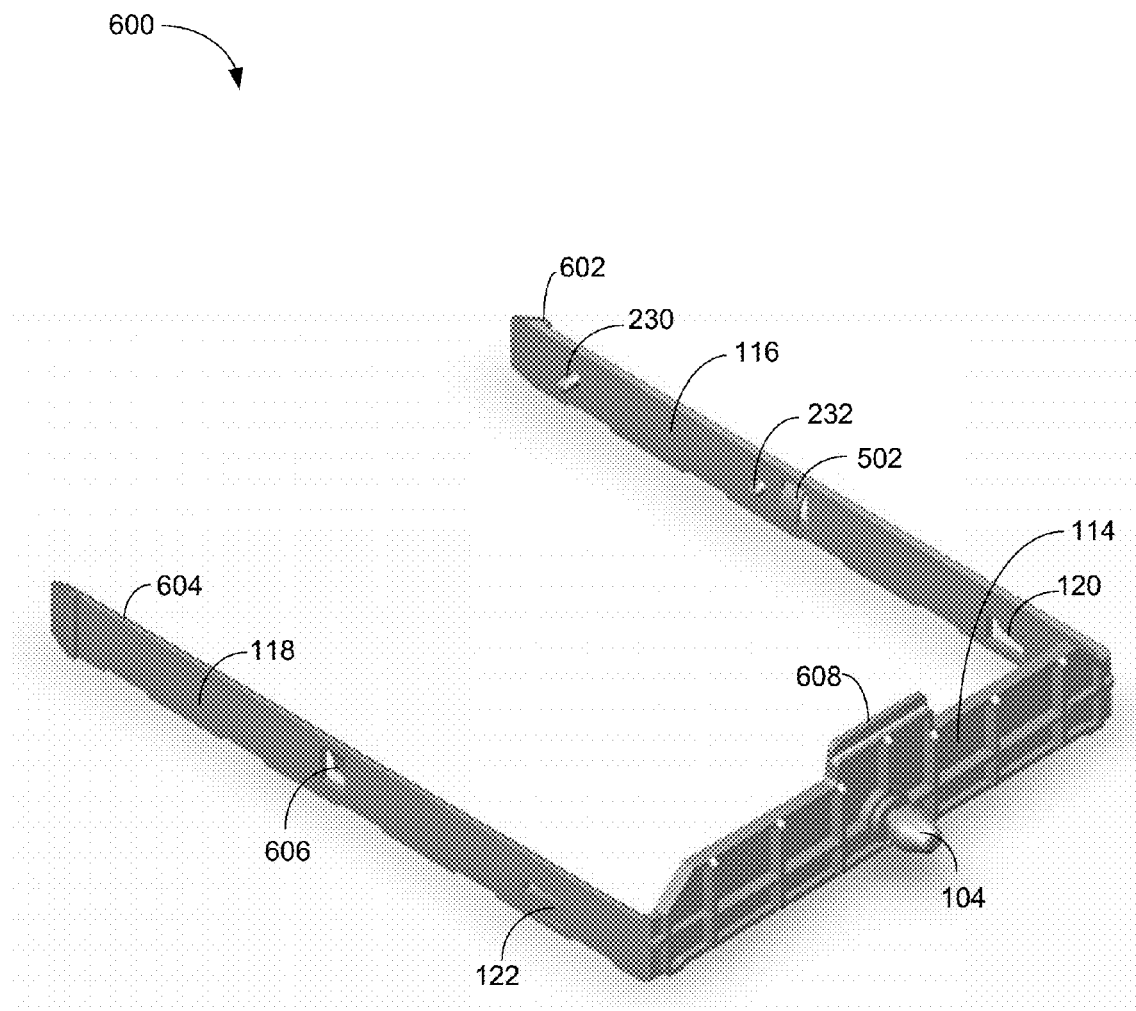
FIG. 6 is a 3D perspective diagram illustrating an U-shaped semi-flexible anchoring frame in accordance with embodiments of the present invention.

FIG. 6 is a 3D perspective diagram illustrating a USA frame in accordance with embodiments of the present invention. Diagram 600 includes front piece 114, right strip 116, and left strip 118. Front piece 114 also includes a locking mechanism 104 and a lip 608. While lip 608 may be used to pull the USA frame away from a tray, locking mechanism 104 is used to lock or seat the USA frame to the tray. It should be noted that the underlying concept of the exemplary embodiment(s) of the present invention would not change if one or more components (or units) were added to or removed from diagram 600.

Right strip 116 includes engaging pins 230-232, elastic clamp 502, and stopper 120, wherein top portion 602 of right strip 116 is used to fit inside of the track on the right panel. While stopper 120 is used to determine how far the USA frame can move within the tray, engaging pins 230-232 and elastic clamp 502 are used to stabilize or fasten HDD to the USA frame. Left strip 118 includes engaging pins, elastic clamp 606, and stopper 122, wherein top portion 604 of left strip 118 is used to fit inside of a track on the left panel. While stopper 122 on left side is used to determine how far the USA frame can move within the tray, engaging pins 230-232 on right side and elastic clamps 502-606 are used to stabilize or fasten HDD to the USA frame.

Figure 7:
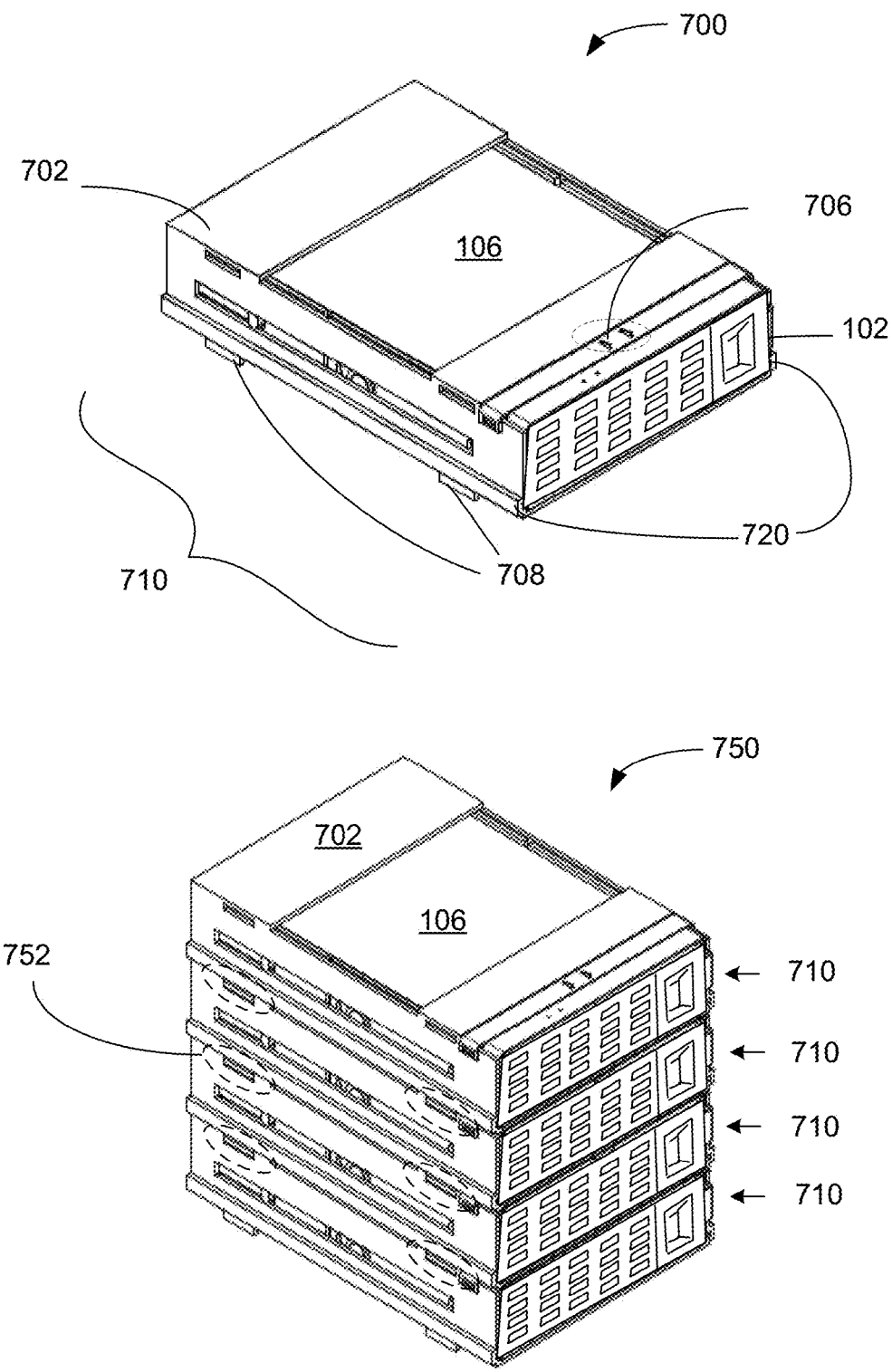
FIG. 7 illustrates exemplary diagrams showing a storage bay or a carrier stack having multiple HDD devices or assemblies configured in a stacked configuration in accordance with one embodiment of the present invention.

FIG. 7 illustrates exemplary diagrams showing a storage bay or carrier stack having multiple HDD devices configured in a stacked configuration in accordance with one embodiment of the present invention. Diagram 700 illustrates an HDD carrier 710 configured to house an HDD device. In one aspect, HDD carrier 710 contains rails 720 for receiving HDD device. For example, rails 720 of HDD carrier 710 are configured to allow a tray or HDD tray of HDD device to slide in and out of HDD carrier 710. HDD carrier 710 further includes a top plate 702, a top stacking anchor 706, and multiple stacking stands 708. While top plate 702 provides protection to HDD 106, top stacking anchor 706 and stacking stands 708 are used for stacking multiple HDD carriers 710 in a horizontal configuration to form a storage bay. In one example, each HDD carrier 710 has four stacking stands 708.

Diagram 750, in one embodiment, includes a storage bay containing four HDD carriers 710 stacked in a vertical configuration. It should be noted that stacking stands 708 are configured to interlock with another HDD carrier 710 situated below whereby a stack of HDD carriers can be safely structured or stacked. In one embodiment, stacking stands 708 are made of shock absorbing material to provide additional shock protection to each HDD carrier 710.

An advantage of having a stacked storage bay is that the capacity of storage can be scaled depending on the applications. Each HDD carrier 710 can be independently removed, added, replaced and/or adjusted without affecting operation of other HDD carriers in storage bay. Storage bay or carrier stack may be used for network storage device for a computer or network management system.

Another advantage of employing storage bay or carrier stack using HDD devices is that maintaining and accessing HDDs are relatively easier since minimal or no tools are required. Furthermore, employing HDD device in a storage bay minimizes requirement for spare parts such as screws and trays.

The exemplary aspect of the present invention includes various processing steps, which will be described below. The steps of the aspect may be embodied in machine or computer executable instructions, or manual procedures. Alternatively, steps and/or procedures may be performed by a user or administrator.

Figure 8:
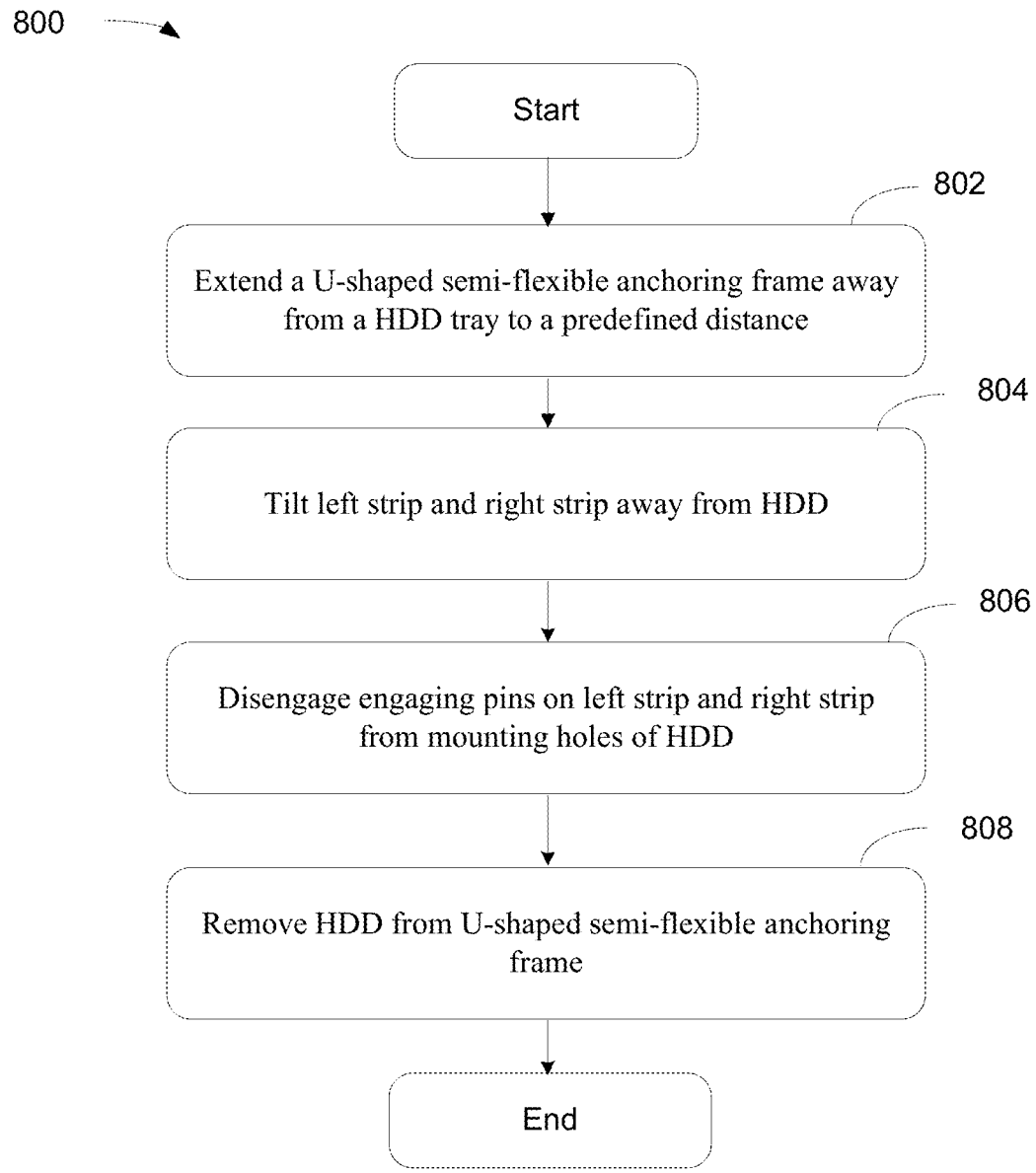
FIG. 8 is a flowchart illustrating a process of removing and/or replacing an HDD from an HDD assembly in accordance with one embodiment of the present invention.

FIG. 8 is a flowchart 800 illustrating a process of removing and/or replacing an HDD from an HDD assembly or device in accordance with one embodiment of the present invention. At block 802, a process of mounting and/or replacing an HDD device includes extending the USA frame away from a HDD tray or a tray to a predefined distance indicated by a stopper which is located on the right strip of the USA frame against a side of tray. In one example, the HDD device which contains HDD, tray, and USA frame is removed from a tower or a storage bay. It should be noted that to pull the USA frame away from the tray, a lock located in the front cover needs to be released. For example, a latch may be pulled or pushed by a user to release the USA frame from the tray via a locking mechanism.

At block 804, upon reaching the pullout configuration, the left strip and the right strip are slightly tilted away from the HDD. Since the strips are made of semi-flexible material, the strips are bendable when portions of the strips slide out of the side panels of the tray.

At block 806, once the right and left strips are bent outward, the engaging pins on the left strip and the right strip are disengaged from the mounting holes of the HDD. It should be noted that the left strip and the right strip are bent away from the side of an HDD. Once the engaging pins are disengaged or pulled out of mounting holes, an HDD, at block 808, can be removed from the USA frame. In one aspect, under the pullout configuration, the USA frame is at least partially supported by the HDD tray.

To replace HDD, a new or second HDD is inserted into the USA frame when the USA frame is still in a pullout configuration. After aligning at least a portion of the engaging pins on the right strip to a portion of mounting holes of the new HDD, the right strip is allowed to flexibly tilt toward to the side of the second HDD permitting at least a portion of engaging pins to move inside mounting holes of second HDD so that the second HDD is attached or secured to the USA frame. Similarly, the left strip is allowed to flexibly tilt toward to the second HDD allowing at least a portion of engaging pins on the left strip to move inside mounting holes of second HDD to reinforce the attachment between the new HDD to the USA frame.

It should be noted that the USA frame may further include elastic clamps that provide pushing force to stabilize the new HDD with the USA frame. After new HDD is attached to the USA frame, the USA frame is pushed toward to the front cover along the tracks of tray to secure the HDD to the tray via a locking mechanism associated with the USA frame. In one aspect, the process involves in pushing a portion of an engaging pin into a mounting hole of HDD wherein the mounting hole may contain threads configured to receive a threaded screw for fastening.

While particular embodiments of the present invention have been shown and described, it will be obvious to those of ordinary skills in the art that based upon the teachings herein, changes and modifications may be made without departing from this exemplary embodiment(s) of the present invention and its broader aspects. Therefore, the appended claims are intended to encompass within their scope all such changes and modifications as are within the true spirit and scope of this exemplary embodiment(s) of the present invention.

What is claimed is:

1. A method of mounting a hard-disk drive ("HDD") to a HDD device, comprising:

extending a U-shaped semi-flexible anchoring ("USA") frame away from a HDD tray to a predefined distance indicated by at least one stopper located at a right strip of the USA frame;

tilting a left strip and the right strip away from the HDD as the USA frame is extending away from the HDD tray;

disengaging a plurality of engaging pins on the left strip and the right strip from a plurality of mounting holes of the HDD as the left strip and the right strip bend away from the HDD; and removing the HDD from the USA frame which is at least partially supported by the HDD tray.

2. The method of claim 1, further comprising removing the HDD tray with the USA frame from a tower.

3. The method of claim 2, further comprising:

pulling the USA frame away from the HDD tray to reach a pullout configuration;

inserting a second HDD into the USA frame which is at least partially supported by the HDD tray; and aligning at least a portion of the plurality of engaging pins on the right strip to a portion of a plurality of mounting holes of the second HDD.

4. The method of claim 3, further comprising:

allowing the right strip to flexibly tilt toward to the second HDD allowing at least a portion of the engaging pins to be inserted into the mounting holes of the second HDD so that the second HDD is attached to the USA frame; and pushing the USA frame along a track on each side of the HDD tray to secure the HDD to the HDD tray via a locking mechanism of the USA frame.

5. The method of claim 4, further comprising allowing the left strip to flexibly tilt toward to the second HDD and allowing at least a portion of the engaging pins on the left strip to move inside the mounting holes of the second HDD for attaching the second HDD to the USA frame.

6. The method of claim 5, wherein allowing at least a portion of the engaging pins on the left strip to move inside the mounting holes of the second HDD includes inserting a portion of an engaging pin into a mounting hole which has threads capable of receiving a threaded screw for fastening.

7. A method of mounting a hard-disk drive ("HDD") to a HDD device, comprising:

pulling a HDD tray away from a memory tower;

extending a U-shaped semi-flexible anchoring ("USA") frame further away from the HDD tray to a predefined distance indicated by at least one stopper;

disengaging a plurality of engaging pins on a left strip of the USA frame from a plurality of mounting holes of the HDD as the left strip tilts away from the HDD when the USA frame is moving away from the HDD tray; and removing the HDD from the USA frame which is at least partially supported by the HDD tray.

8. The method of claim 7, further comprising:

pulling the USA frame away from the HDD tray to reach a pullout configuration; and inserting a flash memory card into the USA frame which is at least partially supported by the HDD tray.

9. The method of claim 8, further comprising aligning at least a portion of the plurality of engaging pins on the left strip to a portion of a plurality of mounting holes of the flash memory card.

10. The method of claim 9, further comprising allowing the left strip to flexibly tilt toward to the flash memory card and allowing at least a portion of the engaging pins to be inserted into the mounting holes of the flash memory card so that the flash memory card is attached to the USA frame.

* * * * *